(12) United States Patent
Von Gellhorn et al.

(10) Patent No.: US 7,824,742 B2
(45) Date of Patent: Nov. 2, 2010

(54) PLASMA-COATED CONVEYOR BELT

(75) Inventors: Edgar Von Gellhorn, Sins (CH); Rainer Dahlmann, Aachen (DE); Brigitte Velten, Oberengstringen (CH)

(73) Assignee: Habasit AG, Reinach (CH)

( * ) Notice: Subject to any disclaimer, the term of this patent is extended or adjusted under 35 U.S.C. 154(b) by 897 days.

(21) Appl. No.: 10/579,593

(22) PCT Filed: Nov. 18, 2004

(86) PCT No.: PCT/CH2004/000695

§ 371 (c)(1), (2), (4) Date: May 17, 2006

(87) PCT Pub. No.: WO2005/049227

PCT Pub. Date: Jun. 2, 2005

(65) Prior Publication Data

US 2007/0071928 A1    Mar. 29, 2007

(30) Foreign Application Priority Data

Nov. 18, 2003  (CH) .................................... 1974/03

(51) Int. Cl.
  *H05H 1/24*  (2006.01)
  *B05D 7/24*  (2006.01)
  *B65G 15/32*  (2006.01)
(52) U.S. Cl. .................... 427/569; 428/411.1; 427/575
(58) Field of Classification Search ................. 427/569, 427/575
  See application file for complete search history.

(56) References Cited

U.S. PATENT DOCUMENTS

| | | | | |
|---|---|---|---|---|
| 4,693,799 A | * | 9/1987 | Yanagihara et al. ......... | 204/165 |
| 4,729,906 A | * | 3/1988 | Kleeberg et al. ............ | 427/490 |
| 4,767,641 A | * | 8/1988 | Kieser et al. ................ | 427/569 |
| 5,244,730 A | * | 9/1993 | Nguyen et al. .............. | 428/336 |
| 5,529,631 A | * | 6/1996 | Yoshikawa et al. .......... | 118/718 |
| 5,565,049 A | * | 10/1996 | Simmons et al. ........... | 156/62.6 |
| 5,744,241 A | * | 4/1998 | Hobson et al. .............. | 428/422 |
| 5,888,591 A | * | 3/1999 | Gleason et al. ............. | 427/522 |
| 2002/0142105 A1 | | 10/2002 | Hum | |

FOREIGN PATENT DOCUMENTS

| | | |
|---|---|---|
| EP | 0487059 A2 | 5/1992 |
| EP | 0667309 A1 | 1/1997 |
| EP | 1063448 A2 | 5/2003 |
| GB | 1402275 | 8/1975 |

OTHER PUBLICATIONS

Document entitled in handwriting as Houben-Weyl: Methoden der org. Chemie 4. Auflage Band E 20 Teil 1.
Document IKV-Kolloquium Aachen 2000.
Website printout from the Institute of Polymer Research in Dresden, Germany (http://www.ipfdd.de/people/nitschke/plasma.html).
Website printout for ps. 1010's air-to-air design (http://www.4thstate.com/PS%201010.htm).

* cited by examiner

*Primary Examiner*—David Turocy
(74) *Attorney, Agent, or Firm*—Hodgson Russ LLP

(57) ABSTRACT

Conveyor belt bodies having a plastic material or having an upper plastic layer that typically has an elasticity module of between approximately 200 and approximately 900 N/mm$^2$, the bodies being coated by means of a plasma coating, especially in a plasma produced by microwaves or high frequency, whereby conveyor belts with covering layers are obtained. The covering layer provides the conveyor belts, for example, with increased chemical or scratch resistance or reduces the abrasion thereof. Suitable monomers for the plasma coating are, for example, tetrafluorethylene, 1, 2-difluorethylene, acetylene or hexamethyldisiloxane.

10 Claims, 2 Drawing Sheets

PLASMA-COATED CONVEYOR BELT

FIELD OF THE INVENTION

The present invention relates to conveyor belts with surface-modifying outer layers.

BACKGROUND OF THE INVENTION

Conveyor belts generally comprise a foil composed of a fusible thermoplastic or of thermoplastic elastomers, so that the two ends of the conveyor belt can be bonded by way of a combined fusion and welding process, to form a continuous conveyor belt. At the same time, the fusible foil forms the belt surface on which the product to be transported is conveyed. In order to modify the belt surface as a function of the required use, e.g. to render the belt surface adhesive or less adhesive, or to increase its scratch resistance or its chemicals resistance, new development work has always hitherto had to be carried on the thermoplastic foil.

In order to eliminate this new development work, surface-modifying outer layers (e.g. composed of Teflon) have in some instances previously been laminated or calendared onto conveyor belts. The problem with this surface modification of conveyor belts is that release of the coating has to be avoided even during long-term operation of the conveyor belt and during repeated flexing over the deflector rolls. This problem is amplified by the fact that the conveyor belt itself has to have some degree of elasticity because during flexing over the deflector rolls the outer side of the conveyor belt is subjected to scratching and bending. The modifying outer layer has to accept involvement in these stretching and bending processes.

The coating of rigid articles, such as plastics bottles or plastics pipes, is sometimes carried out by the plasma-coating process in radio-frequency plasma. However, the problem of adequate adhesion of the coating during flexing, bending or stretching of the substrate does not arise here.

The radio-frequency plasma coating of packaging foils is likewise known. Although packaging foils are flexible they are not very elastic (the modulus of elasticity to DIN 53 455 of plastics used for packaging foils, e.g. polypropylene, being typically markedly greater than $1000 N/mm^2$) and the amount of surface elongation likely to occur during flexing is therefore only very small. Again, the flexing of the foil here takes place only once, namely during packaging of the product. The requirements placed upon the adhesion of a plasma coating here are therefore not comparable with the requirements for the adhesion of outer layers in conveyor belts.

One known problem in the plasma coating of plastics is the tendency of the plastics substrate to evolve gases in the vacuum in which the plasma-coating process is undertaken, and possibly also to release residual contents of volatile monomers. These gases accumulate under the (low-gas-permeability) plasma-polymer layer as it forms, and can weaken its adhesion to the plastics substrate. This effect becomes amplified as the plasma-coating time increases, because over the course of time the outer layer formed becomes increasingly thick and increasingly impermeable to gases. The evolution of gases can be eliminated only to some extent via prior storage of the plastic in a vacuum for a prolonged period.

SUMMARY OF THE INVENTION

It was an object of the present invention to produce a conveyor belt whose surface properties can be varied widely by means of an outer layer, without any continuing need for new development work on the actual conveyor-belt base.

The invention achieves the object via a conveyor belt which comprises an outer layer produced by means of plasma coating.

Surprisingly, it has been found that surface-modification can be carried out on previously known conveyor belts to give inventive conveyor belts by means of plasma coating without prior roughening or etching of the surface of the external layer, and that when conveyor belts thus modified are flexed over the radii, typically from about 20 to 30 mm, arising in attendant deflector rolls, the plasma coating does not separate from the conveyor belt or crack, even in long-term tests.

For the purposes of the present application, the expression "conveyor-belt base" means the conveyor belt with all of its possible layers and sublayers, with the exception of the outer layer applied according to the invention via plasma coating. The conveyor-belt base is the starting material for the process, which is likewise provided by the present application, of coating by means of plasma coating.

The plasma-coating process gives, on the inventive conveyor belts, a generally polymeric outer layer, which cannot then be characterized sufficiently by features inherent to the material. In particular, when these outer layers are polymeric, the structure of the polymer present therein is only to a limited extent predictable from the nature of the monomers used (a known fact being that polymerization in plasma can even involve monomers which cannot be polymerized by way of conventional free-radical or ionic polymerization in solution). The degree of crosslinking of a plasma polymer is higher than in conventional polymerization reactions; plasma polymers have marked crosslinking even when the only monomers used are those which in a conventional polymerization reaction would in essence give non-crosslinked polymers. For the purposes of the present application, the expression "outer layer produced via plasma coating" comprises polymeric and non-polymeric outer layers deposited on the conveyor-belt base and obtainable via reaction of monomers in a plasma.

The process feature of production of the outer layer by means of plasma coating in the inventive conveyor belts is discernable from various properties. The first of these is the very low thickness typical of plasma coatings, generally at most a few µm. In contrast, outer layers produced via conventional processes (e.g. calendaring, extrusion lamination) have thicknesses which are typically at least a few tenths of a millimeter. Another feature of an outer layer produced by means of plasma coating can be that the oxygen content of the surface of the outer layer is high and independent of the nature of the monomers used (typically from about 10 to about 30 atom %, often about 20 atom %, determinable by means of XPS="X-ray photoelectron spectroscopy"). The manner in which this oxygen content is brought about is that the free radicals still present on the surface of the outer layer after the plasma reaction (generated via the plasma reaction) are consumed by reaction with atmospheric oxygen. Another, general feature is a high proportion of crosslinking, discernable in the infrared spectrum to the extent that bands of functional groups (e.g. of carbonyl, carbon-carbon double bonds, hydroxy) have been broadened and shifted toward smaller wave numbers when comparison is made with corresponding bands in conventional polymers. If an outer layer produced via plasma coating is polymeric, another characteristic indicator is provided by markedly broadened bands in the XPS spectrum, caused by a wide variety of functional groups. Another indicator of production of the outer layer via plasma coating can be provided by the typical very low pore content (also termed "pinholes" in specialist plasma-coating language), discernable in very low gas permeability (measurable by way of permeability P for oxygen by way of example).

According to the invention, the thickness of the outer layer is preferably in the range from about 0.005 to about 10 μm, more preferably in the range from about 0.1 to about 5 μm, these thicknesses being measured by means of scanning atomic force microscopy.

That side of the conveyor-belt base on which the outer layer is present is preferably composed of a plastic whose modulus of elasticity measured to DIN 53457 is from about 200 to about 900 N/mm$^2$ (the entirety of that standard being hereby incorporated by way of reference), in order to ensure flexibility of the finished conveyor belt around the deflector rolls. If an inventive conveyor belt is monolithic, the entire conveyor-belt base is preferably composed of that type of plastic. If the conveyor-belt base comprises two or more layers or sublayers, it is preferable that one uppermost layer or sublayer whose thickness is preferably about 1 mm, onto which an outer layer is deposited according to the invention by means of plasma coating, is composed of that type of plastic.

The outer layer of the inventive conveyor belts can be applied to the conveyor-belt base using continuously operating apparatuses identical with those used for the plasma coating of packaging foils. The conveyor-belt base here can be taken from a wind-off roll which is at atmospheric pressure and transported through a vacuum lock or two or more vacuum locks arranged in series with decreasing pressure into the plasma-coating chamber. The coated conveyor base can then be removed from the plasma-coating chamber by way of one or more vacuum locks. The expression "air-to-air" process is widely used in foil-coating for coating processes carried out on these types of apparatus. The PS 1010 system from "4th State, Inc.", Belmont, Calif., USA is one example of an apparatus operating continuously by an air-to-air process.

The plasma coating is preferably carried out at a pressure of from about 0.01 to about 1 mbar in the coating chamber, more preferably from about 0.1 to about 0.5 mbar, particularly preferably about 0.2 mbar.

The plasma to be used according to the invention is preferably firstly a microwave plasma whose frequency range is from about 1 to about 10 GHz, more preferably from about 1 to about 5 GHz. In theory, it would be possible to construct microwave generators (e.g. klystrons with cavity resonators) for any desired frequencies from these ranges. However, legislation often permits only certain, precisely defined frequencies from these ranges for industrial purposes (avoidance of interruption of radar and radio traffic). For this reason in particular many microwave generators that are available in German-speaking countries and that can be used for the inventive plasma-coating process are designed for a fixed frequency of 2.45 GHz. Another type of plasma whose use is preferred according to the invention is a plasma using radio frequency of from about 5 to about 30 MHz, and here again there can be restriction on the frequencies to values admitted by legislation (e.g. 13.56 or 27.12 MHz).

The resultant plasma is a "cold" plasma whose temperature is typically from about room temperature to about 350 K. No definite process temperature can be stated for the conveyor-belt-base surface to be coated because the temperature of the surface rises as the plasma-coating time increases.

The monomer used for the plasma-coating process is not critical and can be selected exclusively as a function of the desired properties of the outer layer. Examples of these are any of the monomers used in the plasma coating of foils, and having sufficient volatility at the selected pressures and temperatures. Preferred examples of these are:

a) ethene and substituted derivatives thereof, such as halogen- and/or trifluoromethyl-substituted ethenes (e.g. 1,1-difluoroethene, 1,2-difluoroethene, 1,1,2-trifluoroethene, tetrafluoroethene, 1,1,2-trifluoro-2-chloroethene trifluoromethylethene, 1,1,2-trifluoro-2-trifluoromethylethene, or 1,2-difluoro-1,2-bis(tri-fluoromethyl)ethene, or ethene derivatives substituted with π-electron-withdrawing groups (e.g. acrylic acid and its esters, acrylonitrile, vinyl acetate), or vinyl ethers;

b) unbranched or branched alkanes having from 2 to 12, preferably from 2 to 6, carbon atoms (e.g. ethane, propane, butane, 2-methyl-2-propane), or cyclic alkanes having from 4 to 7 carbon atoms (e.g. cyclopentane, cyclohexane);

c) halogenated alkanes, where the halogen atoms have been selected from fluorine and chlorine, and where the total calculated from the number of carbon atoms plus the number of fluorine atoms plus twice the number of chlorine atoms is at most 12, preferably at most 6 (e.g. 1,1,1-trifluoroethane, hexafluoropropane, and chlorofluorocarbons, such as the Freone);

d) silicon-containing monomers (preferably, for example, ($C_3$-$C_{10}$) silanes, such as trimethylsilane, tetramethylsilane, triethylsilane, diethylvinylsilane; symmetrical or asymmetrical ($C_4$-$C_8$) siloxanes, such as hexamethyldisiloxane=HMDSO, and symmetrical or asymmetrical ($C_4$-$C_8$) silazanes, such as hexamethyldisilazane);

e) acetylene and its derivatives substituted with unbranched or branched, optionally fluorine-substituted, alkyl substituents, where the total number of all of the carbon atoms plus all of the fluorine atoms is preferably at most 12, more preferably at most 6 (e.g. 1-propyne, 1- or 2-butyne, 3,3, 3-trifluoro-1-propyne);

f) iso- or heterocyclic unsubstituted or ($C_1$-$C_4$)-alkyl- or ($C_2$-$C_4$)-alkenyl-substituted or halogen-substituted aromatics (e.g. benzene, naphthalene, toluene, ethylbenzene, styrene, divinylbenzene, xylene, pyridine, pyrrole, thiophene, aniline, 1,2-, 1,3-, 1,4-dichlorobenzene, 1,3,5-trichlorobenzene, anisole), where the halogen substituents have preferably been selected from fluorine and chlorine, and where the total calculated from the number of carbon atoms plus the number of oxygen atoms plus the number of nitrogen atoms plus the number of fluorine atoms plus twice the number of sulfur atoms plus twice the number of chlorine atoms is then preferably at most 12.

According to the invention, particularly preferred monomers are hexamethylsiloxane (HMDSO), 1,2-difluoroethene, tetrafluoroethylene, and acetylene.

The gas-flow rates in which the monomer can preferably be fed into the plasma-coating chamber are from about 5 to about 100 sccm ("standard cubic centimeters per minute", the meaning of "standard" here being that the volume is assumed to be measured at 25° C. and 1 bar), but other factors which can be taken into account here are the throughput speed of the conveyor belt to be coated and the thickness of the outer layer to be formed. The flow rates stated above are guideline values for residence times which are typically from 30 seconds to about 5 minutes, with microwave frequency of 2.45 GHz and microwave power of 300 W. It is self-evident that, because the ideal gas equation is applicable, the number of molecules of monomer transported at the pressures used and at a particular gas-flow rate is always approximately the same, irrespective of the nature or of the molecular weight of the monomer.

According to the invention, it is also possible to introduce two or more different monomers simultaneously into the plasma-coating process. The mechanism of the plasma-coating process also permits reaction between monomers which would be assumed not to be copolymerizable in "conventional" polymerization.

The plasma-coating time is advantageously selected after taking into account all of the parameters discussed above and in particular after taking into account the reactivity of the monomers. The ideal reaction time is preferably determined from a series of trials in which the reaction time is varied while the monomer(s), pressure, substrate to be coated, apparatus, microwave frequency, and microwave power are kept constant. The guideline value for the reaction time can be from about 30 seconds to about 6 minutes.

The plasma-coating process can, if desired, be carried out with simultaneous addition of $O_2$ as auxiliary gas, using a gas-flow rate which is typically from about 20 to 40 sccm, thus incorporating additional O-containing groups (hydroxy groups, carboxy groups, carbonyl groups) into the outer layer. If the plastic of that surface of the conveyor-belt base that is to be coated is, by way of example, a plastic having O- or N-containing functional groups (for example a polyurethane, polyester, or polyamide), the plasma-coating process is preferably carried out with addition Of $O_2$, thus increasing the affinity of the outer layer for the surface. One monomer preferred according to the invention and plasma-polymerized using addition of $O_2$ is hexamethyldisiloxane (HMDSO). On the other hand, if the plastic of that surface of the conveyor-belt base that is to be coated is in essence free from functional groups, as is the case, for example, in a thermoplastic polyolefin, the plasma-coating process is preferably carried out without addition of $O_2$. However, the surface of the conveyor-belt base can be pretreated with an $O_2$ plasma or Ar plasma.

The outer layer formed can, if desired, be exposed in a known manner, during the plasma-coating process or as post-treatment, to an argon microwave plasma. This generates relatively stable free radicals on the surface of the outer layer, and these can be further polymerized in a grafting process via contact with a gaseous olefinic monomer. On the other hand, these free-radical centers can also be consumed subsequently by reaction with atmospheric oxygen, thus permitting achievement of increased oxygen content (i.e. also a higher level of hydrophilic properties of the surface).

In one preferred embodiment, the outer layer on the inventive conveyor belt comprises an underlayer likewise produced via plasma coating whose constitution differs from that of the remainder of the outer layer, the outer layer being applied by way of the underlayer to the conveyor-belt base. The underlayer and the remainder of the outer layer can be applied in succession to the conveyor-belt base. The different constitution can be achieved via use of different monomers and/or different plasmas. The expression "different plasma" used for the purposes of the present application is intended to mean a plasma which differs from a first plasma via at least one of the parameters pressure, temperature, radiation power, and radiation frequency, and/or plasma-coating time, and/or differs from the first plasma with respect to the nature, the pressure, and/or the gas-flow rate of any comonomer or auxiliary gas, such as $O_2$ and Ar.

One preferred process for coating of a conveyor-belt base with a layer composite composed of an underlayer and of an outer layer can consist in, in the presence of a gaseous monomer capable of excitation in a first plasma, exposing the conveyor-belt base to a first plasma in such a way that the first gaseous monomer is excited for purposes of forming an underlayer on the conveyor-belt base. Auxiliary gases and other comonomers can be used in this first coating step, if desired. Alternatives in a second step are either that:

a) in the presence of monomer(s) identical with that/those in the first coating step, the underlayer is subjected to a second plasma differing from the first plasma, or that b) in the presence of a second gaseous monomer capable of excitation in a plasma and differing from the first monomer, and, if desired, with concomitant use of auxiliary gases, the underlayer is exposed to a plasma.

The product from the two alternatives a) or b) is a layer composite in which the outer layer has been superposed on the conveyor-belt base by means of the underlayer.

A layer composite composed of an outer layer and of an underlayer, both of which have been produced via plasma coating, can modify the surface properties of the inventive conveyor belts, as is previously known from the foil-coating sector, with respect to permeability to solvents or gases, the result differing from that obtainable by simply adding the permeabilities of the outer layer and of the underlayer. The permeabilities of layer composites of this type to gases and solvents, and the dependency of these properties on the coating process and on the nature of the substrate have to some extent previously been studied for foils. Reference is made by way of example to the article "IKV Kolloquim Aachen 2000" [IKV conference Aachen 2000], section 5: "Plasmaunterstützte Schichtabscheidung zur Optimierung von Permeationseigenschaften [Plasma-supported layer deposition for optimization of permeation properties] (pages 16-20).

An outer layer which comprises an underlayer can also be advantageous when the actual desired outer layer does not have adequate adhesion on the surface of the conveyor-belt base. In this case, a first sublayer (an underlayer) can first be applied to the conveyor-belt base by means of plasma coating in such a way that it can assume the function of an adhesion promoter between the material of the conveyor-belt base and the actual outer layer. By way of example, this type of adhesion-promoting underlayer can be obtained via plasma coating using HMDSO, if desired with addition of $O_2$. Addition of $O_2$ can control the adhesion-promoting properties of this type of underlayer, while taking into account the specification of the conveyor-belt base and of the actual outer layer. It appears conceivable that the HMDSO/$O_2$ plasma-coating system can be used as an intimately controllable adhesion-promoting system which firstly can improve the adhesion of polar or hydroxy-containing outer layers on polyolefin conveyor belts and secondly can improve the adhesion of, for example, polyolefin outer layers or poly(fluoroolefin) outer layers on, by way of example, polyurethane conveyor-belt bases. The content of the $O_2$ auxiliary gas during the plasma coating of the HMDSO is varied, and it is also possible to operate here with time-based gradients of $O_2$ content. By way of example, in the case of a conveyor-belt base composed of polyolefin or with an external layer composed of polyolefin, the adhesion-promoting layer can initially be applied without $O_2$ in order to permit ideal adhesion to the polyolefin, and the $O_2$ content introduced can be increased gradually during the course of the remaining plasma coating of the HMDSO in such a way that the underlayer has no sudden changes in constitution and has ideal internal adhesion, and that at conclusion of HMDSO plasma coating the $O_2$ content introduced is precisely high enough to ensure that, taking into account the polarity and hydrophilic properties of the remainder of the outer layer to be applied subsequently, its adhesion to the underlayer is ideal.

With respect to other aspects of the underlayer, the information listed above for the actual outer layer can be adopted in relation to monomers and process parameters.

According to the invention, there is no requirement for any chemical pretreatment (e.g. etching of the surface) or mechanical roughening of the conveyor belt prior to plasma coating. However, it is preferable that the surface of the conveyor belt is subjected to prior cleaning which removes dust and grease films, and this can be achieved by way of example via washing with suitable solvents, such as alcohols or perchloroethylene, and subsequent drying.

The surface properties of the inventive conveyor belts can be varied widely merely via the outer layer produced by means of plasma coating, while the underlying structure of the conveyor belt can be designed using a conveyor-belt base which never varies. The outer layers produced via plasma coating have marked crosslinking and give the inventive conveyor belts good resistance to solvents and to abrasion, and make them scratch-resistant. In particular, markedly hydroxylated outer layers can be produced via concomitant use of $O_2$ as auxiliary gas, thus permitting production of conveyor belts with hydrophilic surfaces.

On the other hand, outer layers which give the inventive conveyor belts chemicals resistance or reduced adhesiveness (i.e. reducing the adhesion of the product to be transported on the surface of the conveyor belt) can be produced via use of, in particular, fluorinated monomers.

The invention will now be further illustrated with reference to the attached drawings and the examples.

DETAILED DESCRIPTION OF THE INVENTION

Figure 1A:
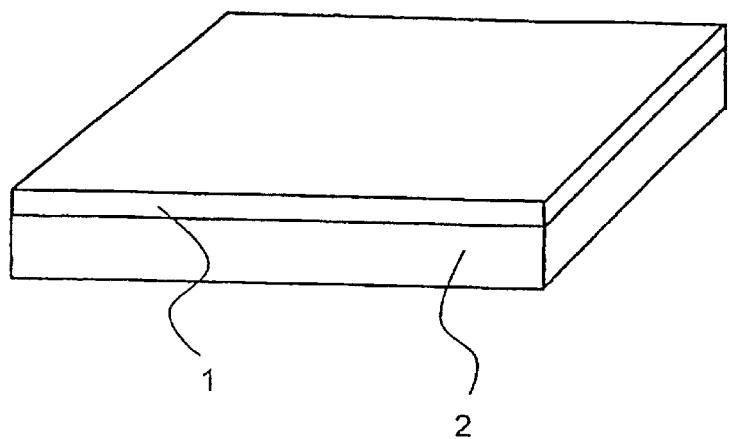
FIG. 1a shows an inventive monolithic (i.e. without reinforcing textile layer) conveyor belt with an outer layer produced via plasma coating

The conveyor belt of FIG. 1a is composed firstly of an outer layer 1 and of a conveyor-belt base 2. This in turn is composed by way of example of a high-creep-strength thermoplastic whose modulus of elasticity is preferably from 200 to 900 $N/m^2$. The selection of the plastic of the conveyor-belt base 2 here is also preferably such as to provide good weldability to give a continuous conveyor belt. Examples of plastics of this type are TPE-A, TPE-E or TPE-U, PE, PA, or EDPM. The outer layer 1 has been produced from tetrafluoro-ethylene, 1,2-difluoroethylene, acetylene, HMDSO, or HMDSO with addition of $O_2$. On the side opposite to the outer layer 1, the conveyor-belt base 2 can have other layers not shown in the figure, for example a frictional layer composed of rubber to increase adhesion to the deflector rolls.

Figure 1B:
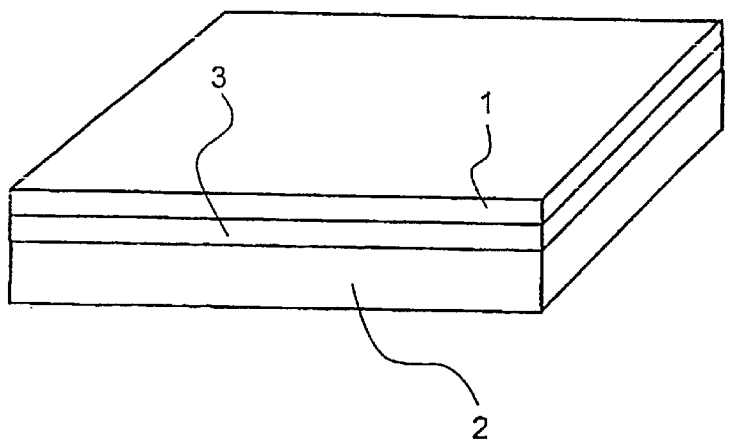
FIG. 1b shows an inventive monolithic conveyor belt with an outer layer produced via plasma coating and with an underlayer produced via plasma coating

The conveyor belt of FIG. 1b has, unlike the conveyor belt of FIG. 1a, an outer layer 1 which in turn comprises an underlayer 3 of different constitution and/or thickness and has in particular been produced via plasma coating with different monomers. In other respects, the conveyor belt can be similar to the conveyor belt of FIG. 1a.

Figure 2:
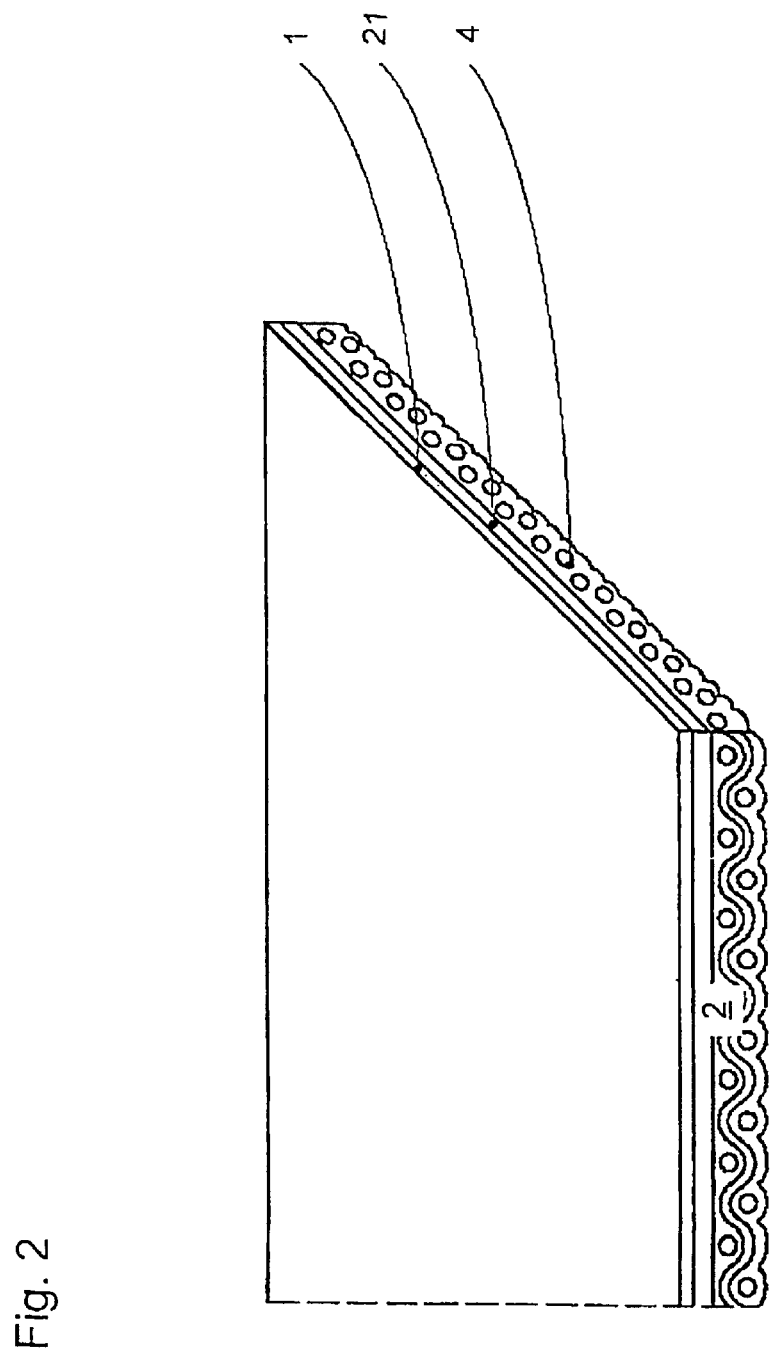
FIG. 2 shows an inventive conveyor belt reinforced by woven material and having an outer layer produced via plasma coating

FIG. 2 shows a conveyor belt which comprises a conveyor base 2 whose interior has a reinforcing woven layer 4. The conveyor base 2 comprises an uppermost layer 21 which by way of example can be a conventional fusible foil for welding of the conveyor belt. The layer 21 can preferably at the same time be a plastics layer whose modulus of elasticity is from 200 to 900 $N/mm^2$. Instead of a woven layer 3, layers which are not woven can also be present, examples being knits or nonwovens. The woven layer 4 can be composed of a material such as nylon-6, nylon-6,6, polyester, aramid, polypropylene, or cotton.

EXAMPLES

Examples 1-1 to 1-29

Production of Conveyor Belt Specimens with an Outer Layer Produced Via Plasma Coating Prior to the plasma-coating process, a specimen of 10×10 $cm^2$ of surface of a conveyor-belt base as in column 2 of Table 1 was cleaned with isopropanol to remove dust. The specimen was subjected, if desired, to pretreatment with oxygen, with plasma excitation via microwaves (if stated in column 3 of Table 1). For the actual coating process, the conveyor-belt base was coated with the monomer and, if appropriate, with the auxiliary gas, using gas-flow rates as in column 4 of Table 1, for a time stated in column 5 of Table 1.

Total pressure in the plasma-coating chamber was 0.2 mbar in all cases. The plasma-coating process used a microwave generator with fixed frequency of 2.45 GHz (produced by Muegge Electronic GmbH, Reichelsheim, Germany), the power used for coating being as in column 6 of Table 1.

The qualitative properties observed for the outer layer 1 thus applied are listed in column 7 of Table 1, with the exception of Experiments 1-17, 1-24, and 1-27, where the layers obtained had merely the function of an underlayer 3. The properties studied were the appearance of the outer layer (visual), abrasion resistance on rubbing with a paper towel (any damage to the outer layer being studied under a microscope), and adhesion on flexing of the specimen around a tube of diameter 35 mm, the outer layer being on the outside. All of the outer layers produced had adhesion-reducing action.

The process of Example 1 is transferable to entire conveyor belts, using a continuously operating coating system, by converting the process time stated in Table 1 into a residence time of each of the sections to be coated of the conveyor-belt base in the continuously operating system, using an appropriate feed velocity.

TABLE 1

| Ex. No. | Material of conveyor-belt base or of uppermost layer of conveyor-belt base | $O_2$ pretreatment yes/no (if yes: sccm gas-flow rate, min duration, microwave power in Watts) | Monomer 1 (sccm gas-flow rate):auxiliary gas (sccm gas-flow rate) | Irradiation time (min) | Irradiation power (Watts) | Properties of outer layer |
|---|---|---|---|---|---|---|
| 1-1 | TPE-U, Shore hardness A92 | no | HMDSO(20):$O_2$(100) | 1 | 250 | Good adhesion, abrasion-resistant |
| 1-2 | TPE-U, Shore hardness A92, embossed surface | no | HMDSO(20):$O_2$(100) | 1 | 250 | Good adhesion, abrasion-resistant |

TABLE 1-continued

| Ex. No. | Material of conveyor-belt base or of uppermost layer of conveyor-belt base | O₂ pretreatment yes/no (if yes: sccm gas-flow rate, min duration, microwave power in Watts) | Monomer 1 (sccm gas-flow rate):auxiliary gas (sccm gas-flow rate) | Irradiation time (min) | Irradiation power (Watts) | Properties of outer layer |
|---|---|---|---|---|---|---|
| 1-3 | TPE-A | no | HMDSO(20):O₂(100) | 1 | 250 | Good adhesion, abrasion-resistant |
| 1-4 | PU, partly crosslinked | no | HMDSO(20):O₂(100) | 1 | 250 | Good adhesion, abrasion-resistant |
| 1-5 | PVC with plasticizer, Shore hardness A85 | no | HMDSO(20):O₂(100) | 1 | 250 | Good adhesion, abrasion-resistant |
| 1-6 | TPE-U, Shore hardness A92 | no | HMDSO(20) | 6 | 300 | Pale brown, good adhesion, abrasion-resistant |
| 1-7 | TPE-O, Shore hardness A92 | no | HMDSO(20) | 6 | 300 | Pale brown, good adhesion, abrasion-resistant |
| 1-8 | TPE-O, Shore hardness A85 | no | HMDSO(20) | 6 | 300 | Pale brown, good adhesion, abrasion-resistant |
| 1-9 | TPE-U, Shore hardness A92, embossed surface | yes (100, 1, 300) | HMDSO(20):O₂(100) | 2 | 300 | Good adhesion, abrasion-resistant |
| 1-10 | TPE-A | yes (100, 1, 300) | HMDSO(20):O₂(100) | 1 | 300 | Good adhesion, abrasion-resistant |
| 1-11 | PU, partly crosslinked | yes (100, 1, 300) | HMDSO(20):O₂(100) | 2 | 300 | Good adhesion, abrasion-resistant |
| 1-12 | TPE-U, Shore hardness A92 | yes (100, 1, 300) | $C_2H_2F_2$(30):Ar(100) | 1 | 300 | Brown, good adhesion, abrasion-resistant |
| 1-13 | TPE-U, Shore hardness A92, embossed surface | yes (100, 1, 300) | $C_2H_2F_2$(30):Ar(100) | 0.5 | 300 | Brown, good adhesion, abrasion-resistant |
| 1-14 | TPE-A | yes (100, 1, 300) | $C_2H_2F_2$(30):Ar(100) | 0.5 | 300 | Good adhesion, abrasion-resistant |
| 1-15 | PU, partly crosslinked | yes (100, 1, 300) | $C_2H_2F_2$(30):Ar(100) | 1 | 300 | Adhesion, moderate abrasion resistance |
| 1-16 | PVC with plasticizer, Shore hardness A85 | yes (100, 1, 300) | $C_2H_2F_2$(30):Ar(100) | 0.5 | 300 | Adhesion, limited abrasion resistance |
| 1-17 | PVC with plasticizer, Shore hardness A85 | yes (100, 1, 300) | $C_2H_2F_2$(30):Ar(100) | 1 | 300 | — |
| 1-18 | TPE-O, Shore hardness A85 | yes (100, 1, 300) | $C_2H_2F_2$(30):Ar(100) | 0.5 | 300 | Good adhesion, limited abrasion resistance |
| 1-19 | TPE-U, Shore hardness A92 | no | $C_2H_2F_2$(30):Ar(100) | 1 | 300 | Brown, good adhesion, abrasion-resistant |
| 1-20 | TPE-O, Shore hardness A85 | no | $C_2H_2F_2$(30):Ar(100) | 1 | 300 | Brown, good adhesion, abrasion-resistant |
| 1-21 | TPE-U, Shore hardness A92 | yes (100, 1, 300) | $C_2H_2$(30):Ar(100) | 1 | 300 | Good adhesion, abrasion-resistant |
| 1-22 | TPE-A | yes (100, 1, 300) | $C_2H_2$(30):Ar(100) | 1 | 300 | Good adhesion, abrasion-resistant |
| 1-23 | PU, partly crosslinked | yes (100, 1, 300) | $C_2H_2$(30):Ar(100) | 1 | 300 | Adhesion, no abrasion resistance |
| 1-24 | PU, partly crosslinked | yes (100, 1, 300) | $C_2H_2$(30):Ar(100) | 0.5 | 300 | — |
| 1-25 | PVC with plasticizer, Shore hardness A85 | yes (100, 1, 300) | $C_2H_2$(30):Ar(100) | 1 | | Adhesion, limited abrasion resistance |
| 1-26 | TPE-O, Shore hardness A85 | yes (100, 1, 300) | $C_2H_2$(30):Ar(100) | 1 | 300 | Good adhesion, abrasion-resistant |
| 1-27 | TPE-O, Shore hardness A85 | yes (100, 1, 300) | $C_2H_2$(30):Ar(100) | 0.5 | 300 | — |
| 1-28 | TPE-O, Shore hardness A92 | no | $C_2H_2$(30):Ar(100) | 1 | 300 | Good adhesion, abrasion-resistant |
| 1-29 | TPE-O, Shore hardness A85 | no | $C_2H_2$(30):Ar(100) | 1 | 300 | Good adhesion, abrasion-resistant |

Examples 2-1 to 2-5

Production of Conveyor Belt Specimens with an Outer Layer Produced Via Plasma Coating, where the Outer Layer Comprises an Underlayer The procedure to produce the starting material (column 2 of Table 2) was that of the general description and Table 1 of Example 1. The resultant intermediate product, which comprised an underlayer (3), was subjected to a second plasma-coating process, where the coating system was identical with that in Example 1. The monomer and any auxiliary gas with the respective gas-flow rates were as in column 3 of Table 2, and microwave irradiation time and power were as in columns 4 and 5. The total gas pressure in the plasma-coating system was 0.2 mbar in all cases.

The qualitative properties observed for the outer layer (1) thus applied are listed in column 6 of Table 2 (the studies undertaken being the same as those in Example 1). All of the layer composites produced had adhesion-reducing action.

The process described here is transferable to entire conveyor belts, using a continuously operating coating system, where two passes are used in feeding the conveyor belt through the continuously operating system. The coating as in columns 3, 4 and, 5 of Table 1 is applied in the first pass, and the coating as in columns 3, 4 and, 5 of Table 2 is applied in the second pass. See also conclusion of Example 1.

TABLE 2

| Ex. No. | Starting material is from Ex. No. | Monomer 2 (sccm gas-flow rate 2):auxiliary gas (sccm gas-flow rate) | Microwave irradiation time (min) | Microwave irradiation power (Watts) | Properties of outer layer |
|---|---|---|---|---|---|
| 2-1 | 1-13 | $C_2H_2(30):Ar(100)$ | 0.5 | 300 | Brown, good adhesion, abrasion-resistant |
| 2-2 | 1-14 | $C_2H_2(30):Ar(100)$ | 0.5 | 300 | Good adhesion, abrasion-resistant |
| 2-3 | 1-17 | $C_2H_2(30):Ar(100)$ | 0.5 | 300 | Adhesion, limited abrasion resistance |
| 2-4 | 1-24 | $C_2H_2F_2(30):Ar(100)$ | 0.5 | 300 | Good adhesion, abrasion-resistant |
| 2-5 | 1-27 | $C_2H_2F_2(30):Ar(100)$ | 0.5 | 300 | Brown, good adhesion, abrasion- resistant |

The invention claimed is:

1. A conveyor belt comprising an outer layer and a conveyor-belt base, the belt base being either monolithic and being composed of a plastic with modulus of elasticity of about 200 to about 900 $N/mm^2$, or the belt base comprising two or more layers and an uppermost layer of these layers being composed of a plastic with modulus of elasticity of about 200 to about 900 $N/mm^2$, and wherein the outer layer has been produced via plasma coating, and has an oxygen content at its surface of about 10 to about 30 atom %, as determined by X-ray photoelectron spectroscopy.

2. The conveyor belt as claimed in claim 1, wherein the outer layer comprises an underlayer produced via plasma coating, and adheres by means of this underlayer to the conveyor-belt base.

3. The conveyor belt as claimed in claim 2, wherein the thickness of the underlayer is from 0.005 to 10 μm.

4. The conveyor belt as claimed in claim 2, wherein the thickness of the outer layer is in the range from 0.005 to 10 μm.

5. The conveyor belt as claimed in claim 1, wherein the thickness of the outer layer is in the range from 0.005 to 10 μm.

6. A process for production of a conveyor belt having an outer layer on a conveyor-belt base, the belt base being either monolithic and being composed of a plastic with modulus of elasticity of about 200 to about 900 $N/mm^2$, or the belt base comprising two or more layers and an uppermost layer of these layers being composed of a plastic with modulus of elasticity of about 200 to about 900 $N/mm^2$, and the outer layer with an oxygen content at the surface of the outer layer of about 10 to about 30 atom%, as determined by X-ray photoelectron spectroscopy, comprising exposing the conveyor-belt base, in the presence of a gaseous monomer capable of excitation in a plasma, to a plasma generated via microwaves of 1 to 10 GHz for purposes of plasma coating of the conveyor-belt base, wherein either the exposure is done with simultaneous addition of $0_2$ as an auxiliary gas, or the process is an air-to-air process.

7. The air-to-air process according to claim 6, wherein the conveyor-belt base is exposed, in the presence of a gaseous monomer capable of excitation in a first plasma, to a first plasma generated via microwaves of 1 to 10 GHz in such a way that the first gaseous monomer is excited for purposes of forming an underlayer on the conveyor-belt base; and then either a) in the presence of said first monomer, the underlayer is exposed to a second plasma generated via microwaves of 1 to 10 GHz different from the first plasma in such a way that the first monomer is excited for purposes of plasma coating of the underlayer, or (b) in the presence of a second gaseous monomer different from the first monomer and capable of excitation in a plasma, the underlayer is exposed to a plasma generated via microwaves of 1 to 10 GHz in such a way that the second monomer is excited for purposes of plasma coating of the underlayer.

8. The process as claimed in claim 7, wherein the monomer(s) is/are selected from: ethene; its derivatives substituted with halogen and/or substituted with trifluoromethyl, or its derivatives substituted with π-electron-withdrawing groups; the unbranched or branched alkanes having from 2 to 12 carbon atoms; the cyclic ($C_4$-$C_7$) alkanes; the halogenated alkanes, where the halogen atoms have been selected from fluorine and chlorine and where the total calculated from the number of carbon atoms plus the number of fluorine atoms plus twice the number of chlorine atoms is at most 12;

the silicon-containing monomers, in particular the ($C_3$-$C_{10}$) silanes, ($C_4$-$C_8$) siloxanes, or ($C_4$-$C_8$) silazanes; acetylene and its derivatives substituted with unbranched or branched, optionally fluorine-substituted alkyl substituents, where the total number of all of the carbon atoms plus all of the fluorine atoms is at most 12; and the iso- or heterocyclic unsubstituted or ($C_1$-$C_4$)-alkyl- or ($C_2$-$C_4$)-alkenyl-substituted or halogen-substituted aromatics, where the total calculated from the number of carbon atoms plus the number of oxygen atoms plus the number of nitrogen atoms plus the number of fluorine atoms plus twice the number of sulfur atoms plus twice the number of chlorine atoms is at most 12.

9. The process as claimed in claim 6, wherein the monomer(s) is/are selected from: ethene; its derivatives substituted with halogen and/or substituted with trifluoromethyl, or its derivatives substituted with π-electron-withdrawing groups; the unbranched or branched alkanes having from 2 to 12 carbon atoms; the cyclic ($C_4$-$C_7$) alkanes; the halogenated alkanes, where the halogen atoms have been selected from fluorine and chlorine and where the total calculated from the number of carbon atoms plus the number of fluorine atoms plus twice the number of chlorine atoms is at most 12; the silicon-containing monomers, in particular the ($C_3$-$C_{10}$) silanes, ($C_4$-$C_8$) siloxanes, or ($C_4$-$C_8$) silazanes; acetylene and its derivatives substituted with unbranched or branched, optionally fluorine-substituted alkyl substituents, where the total number of all of the carbon atoms plus all of the fluorine atoms is at most 12; and the iso- or heterocyclic unsubstituted or ($C_1$-$C_4$)-alkyl- or ($C_2$-$C_4$)-alkenyl-substituted or halogen-substituted aromatics, where the total calculated from the number of carbon atoms plus the number of oxygen atoms plus the number of nitrogen atoms plus the number of fluorine atoms plus twice the number of sulfur atoms plus twice the number of chlorine atoms is at most 12.

10. The process as claimed in claim 9, characterized in that the monomer(s) is/are selected from tetrafluoroethylene, 1,2-difluoroethylene, acetylene, or hexamethyldisiloxane (HMDSO).

* * * * *